US008761715B2

(12) United States Patent
Tiwari

(10) Patent No.: US 8,761,715 B2
(45) Date of Patent: Jun. 24, 2014

(54) APPARATUSES, SYSTEMS, AND METHODS FOR HANDLING DETACHMENT PROCEDURES UPON EXPIRATION OF CLOSED SUBSCRIBER GROUP (CSG) SUBSCRIPTION

(75) Inventor: Kundan Tiwari, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 42 days.

(21) Appl. No.: 13/115,887

(22) Filed: May 25, 2011

(65) Prior Publication Data

US 2011/0294458 A1    Dec. 1, 2011

Related U.S. Application Data

(60) Provisional application No. 61/347,926, filed on May 25, 2010, provisional application No. 61/359,626, filed on Jun. 29, 2010.

(51) Int. Cl.
*H04M 11/04* (2006.01)
*H04W 72/00* (2009.01)

(52) U.S. Cl.
USPC ............... 455/404.1; 455/450; 455/435.1

(58) Field of Classification Search
USPC ........ 455/404.1, 414.1, 432.1–444, 450–453, 455/404.2, 466, 435.1–435.3, 521; 370/329–333
See application file for complete search history.

(56) References Cited

U.S. PATENT DOCUMENTS

| 2004/0029614 | A1* | 2/2004 | Back et al. ................. 455/560 |
| 2004/0192251 | A1* | 9/2004 | Zhao et al. ................. 455/404.1 |
| 2005/0043008 | A1* | 2/2005 | Hurita ........................ 455/404.1 |
| 2007/0254625 | A1* | 11/2007 | Edge .......................... 455/404.1 |
| 2010/0177695 | A1* | 7/2010 | Ji et al. ........................ 370/328 |
| 2010/0297979 | A1* | 11/2010 | Watfa et al. ................ 455/404.1 |
| 2011/0064046 | A1* | 3/2011 | Zhu ............................. 370/331 |
| 2011/0171926 | A1* | 7/2011 | Faccin et al. ............... 455/404.1 |

FOREIGN PATENT DOCUMENTS

| CN | 101335993 A | 12/2008 |
| WO | WO 2010/045854 A1 | 4/2010 |

OTHER PUBLICATIONS

3GPP TS 24.008 V9.0.0, dated Mar. 2009.*
3GPP TS 24.008 V9.1.0, "Technical Specification Group Core Network and Terminals; Mobile radio interface Layer 3 specification; Core network protocols" Stage 3, Release 9, Dec. 2009.
3GPP TS 24.301 V9.1.0, "Technical Specification Group Core Network and Terminals; Non-Acess-Stratum (NAS) protocol for Evolved Packet System (EPS)", Stage 3, Release 9, Dec. 2009.

(Continued)

*Primary Examiner* — Daniel Lai
(74) *Attorney, Agent, or Firm* — Birch, Stewart, Kolasch & Birch, LLP

(57) ABSTRACT

A mobile communication device with a wireless module and a controller module is provided. The mobile communication device is attached to a service network via a cellular station for a non-emergency service, wherein the cellular station is associated with a Closed Subscriber Group (CSG). The controller module determines whether an emergency service is ongoing and initiates a detachment request message of the non-emergency service to the service network via the cellular station, only when no emergency service is ongoing. The wireless module transmits the detachment request message to the service network via the cellular station.

5 Claims, 9 Drawing Sheets

(56) References Cited

OTHER PUBLICATIONS

3GPP TS 25.367V9.1.0, "Technical Specification Group Radio Acess Network; Mobility Procedures for Home NodeB; Overall Description", Stage 2, Release 9, Sep. 2009.

3GPP TS 23.401, "3rd Generation Partnership Project; Technical Specification Group Services and System Aspects; General Packet Radio Service (GPRS) Enhancements for Evolved Universal Terrestrial Radio Access Network (E-UTRAN) . . . ," V9.4.0, Mar. 2010, 14 pages, XP-002657601.

3GPP TS 24.008, "3rd Generation Partnership Project; Technical Specification Group Core Network and Terminals; Mobile radio Interface Layer 3 Specification; Core Network Protocols; Stage 3 (Release 9)," V9.2.0, Mar. 2010, 20 pages, XP-002657578.

HTC, "Handling of Detach Procedure for non-EPS or IMSI Services on a CGS Cell Which is no Longer Valid for the UE and IMS EMG Call is Active," 3GPP TSG CT WG1 Meeting #65, C1-102127, Dublin (Ireland), Jun. 28-Jul. 2, 2010, 2 pages, XP050442908.

Motorola, "MME Initiated Procedure on UE's CSG Membership Expiration," 3GPP TSG SA WG2 Meeting #78bis, S2-102040, Elbonia, Apr. 12-15, 2010, 4 pages, XP050433531.

3GPP, "Digital cellular telecommunications system (Phase 2+); Universal Mobile Telecommunications System (UMTS); General Packet Radio Service (GPRS); Service description; Stage 2 (3GPP TS 23.060 version 9.4.0 Release 9)," ETSI TS 123 060 V9.4.0, Apr. 2010, 299 pages.

3GPP TS 23.060 V9.4.0, "3rd Generation Partnership Project; Technical Specification group Services and System Aspects; General Packet Radio Service (GPRS); Service Description", Stage 2, (Release 9), Mar. 2010.

\* cited by examiner

APPARATUSES, SYSTEMS, AND METHODS FOR HANDLING DETACHMENT PROCEDURES UPON EXPIRATION OF CLOSED SUBSCRIBER GROUP (CSG) SUBSCRIPTION

CROSS REFERENCE TO RELATED APPLICATIONS

This Application claims priority of U.S. Provisional Application No. 61/347,926, filed on 25 May 2010 and U.S. Provisional Application No. 61/359,626, filed on 29 Jun. 2010, and the entirety of which is incorporated by reference herein.

BACKGROUND OF THE INVENTION

1. Field of the Invention

The invention generally relates to detachment procedures, and more particularly, to handling detachment procedures for only non-emergency services upon expiration of a Closed Subscriber Group (CSG) subscription while resources for emergency services also exist.

2. Description of the Related Art

In a typical mobile communication environment, a user equipment (UE) may communicate voice and/or data signals with one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

Take the WCDMA or LTE technology in compliance with the 3GPP TS 24.008 specification, v.9.1.0 (referred to herein as the TS 24.008 specification) and the 3GPP TS 24.301 specification, v.9.1.0 (referred to herein as the TS 24.301 specification) for example. After a UE is powered on and connects to a WCDMA or LIE system, it will need to perform an attachment procedure to register itself to the WCDMA or L'I'E system so that it can obtain mobile communication services from the WCDMA or LTE system. As shown in FIG. 1, the attachment procedure starts by the UE transmitting an ATTACH REQUEST message to the WCDMA or LTE system (step S110). When receiving the ATTACH REQUEST message, the WCDMA or LTE system authenticates the UE, checks if the UE is authorized to have access to mobile communication services, and performs a security mode control procedure to activate the encryption on the subsequent messages in the connection (step S120). If none of the checks fail, the WCDMA or LTE system accepts the attachment request by transmitting an ATTACH ACCEPT message to the UE (step S130). Specifically, the ATTACH ACCEPT message includes configuration information for activating the resources for the mobile communication services. In response to the ATTACH ACCEPT message, the UE establishes the resources for the mobile communication services according to the configuration information (step S140), and transmits an ATTACH COMPLETE message to the WCDMA or LTE system (step S150), to acknowledge that it has received the ATTACH ACCEPT message. If the ATTACH COMPLETE message is received successfully, the attachment procedure ends and the mobile communication services may be provided to the UE.

Later, a detachment procedure may be initiated to de-register the UE from the WCDMA or LIE system. The UE may initiate the detachment procedure for reasons, such as the switching off of the UE, the removal of the Universal Subscriber Identity Module (US') card, or disablement of the wireless module of the UE. Alternatively, the UE may be handed over to another WCDMA or UE system where the UE does not have access to the packet data service, and the WCDMA or LTE system may initiate the detachment procedure. FIG. 2 is a message sequence chart illustrating a detachment procedure initiated by a UE. The UE first transmits a DETACH REQUEST message to the WCDMA or LIE system to de-register itself from the WCDMA or LIE system for mobile communication services (step S210). When receiving the DETACH REQUEST message, the WCDMA or LIE system locally deactivates all established resources for the mobile communication services (step S220). Subsequently, the WCDMA or LTE system transmits a DETACH ACCEPT message to the UE to inform that the detachment request has been accepted (step S230). After receiving the DETACH ACCEPT message, the UE accordingly deactivates the established resources for the mobile communication services, and the detachment procedure ends (step S240).

BRIEF SUMMARY OF THE INVENTION

In another aspect of the invention, a mobile communication device is disclosed, attached to a service network via a cellular station for an non-emergency service, wherein the cellular station is associated with a Closed Subscriber Group (CSG), comprising a controller module and a wireless module. The controller module determines whether an emergency service is ongoing, and initiates a detachment request message of the non-emergency service to the service network via the cellular station, only when no emergency service is ongoing. The wireless module transmits the detachment request message to the service network via the cellular station.

In one aspect of the invention, a mobile communication device comprising a wireless module and a controller module is provided. The wireless module performs wireless transceiving to and from a cellular station of a service network, wherein the cellular station is associated with a CSG. The controller module is configured with a membership of the CSG for a valid period of time and is attached to the service network for non-emergency services and emergency services. The controller module transmits a detachment request message indicating detachment of only the non-emergency services to the cellular station via the wireless module after the valid period of time has passed, and deactivates only established resources for the non-emergency services in response to receiving a subsequent message from the cellular station via the wireless module.

In another aspect of the invention, a method for handling a detachment procedure upon expiration of a CSG subscription by a mobile communication device is provided. Particularly, the mobile communication device is attached to a service network via a cellular station for non-emergency services and emergency services, and the cellular station is associated with a CSG. The method comprises the steps of transmitting a detachment request message indicating detachment of only the non-emergency services, after expiration of a previously authorized membership of the CSG, receiving a subsequent message corresponding to the detachment request message from the service network via the cellular station, and deactivating message.

In yet another aspect of the invention, a control node in a service network is provided, comprising a transceiver module and a control module. The transceiver module receives a detachment request message from a mobile communication device via a cellular station, and is associated with a Closed Subscriber Group (CSG). The control module determines whether the mobile communication device has an emergency service, and an authorized membership of the CSG, in response to the detachment request message, and deactivates only established resource for a non-emergency service in response to the mobile communication having the emergency service and not having the authorized membership of the CSG.

In still another aspect of the invention, a method for handling a detachment procedure upon expiration of a CSG subscription by a service network is provided. The method comprises the steps of receiving a detachment request message indicating detachment of only non-emergency services from a mobile communication device via a cellular station associated with a CSG, determining whether the mobile communication device is attached for the non-emergency services and emergency services, and whether the mobile communication device has an authorized membership of the CSG, in response to the detachment request message, and locally deactivating only established resources for the non-emergency services in response to the mobile communication device being attached for the non-emergency services and the emergency services and not having the authorized membership of the CSG.

Other aspects and features of the present invention will become apparent to those with ordinarily skill in the art upon review of the following descriptions of specific embodiments of apparatuses, systems, and methods for handling detachment procedures upon expiration of a CSG subscription.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

A WCDMA or LIE system may comprise femtocells which are commonly designed for residential or small business environments, and can provide wireless coverage to UEs using the WCDMA or LTE technology to communicate with the UEs and an existing broadband Internet connection (e.g., digital subscriber line (DSL), cable, etc.) for backhaul. When configured in a closed mode, a femtocell only provides access to a limited set of UEs, wherein the limited set may be referred to as a CSG. The CSG which is associated with a femtocell is configured during the set-up of the femtocell and is denoted by its CSG Identity (CSG ID). The network operator allocates CSG ID values throughout the network, and multiple femtocells may be part of the same CSG, e.g. they will in this case have the same CSG ID allocated. A UE may only obtain mobile communication services from a CSG cell if the UE has an authorized CSG membership which the CSG cell belongs to. Regarding detailed descriptions of the CSG, reference may be made to the 3GPP TS 25.367 specification, v.9.1.0 (referred to herein as the TS 25.367 specification). Note that, in the case where a UE is attached to a WCDMA or LIE system via a CSG cell for mobile communication services, including the non-emergency services and the emergency services, if the UE initiates a detachment procedure for detaching only the non-emergency services after expiration of the authorized CSG membership to which the CSG cell belongs, the WCDMA or LIE system will request the UE to detach all of the mobile communication services, i.e., the non-emergency services and the emergency services. As a result, an on-going emergency call may be dropped and it may take time to initiate another emergency call. Both the emergency services and non-emergency services may be bearer services or teleservices, and may be a circuited switched (CS) or packet switched (PS) types of services. In one example, the emergency service is a CS call and a teleservice. In another example, the emergency is an IMS call and a bearer service.

Figure 1:
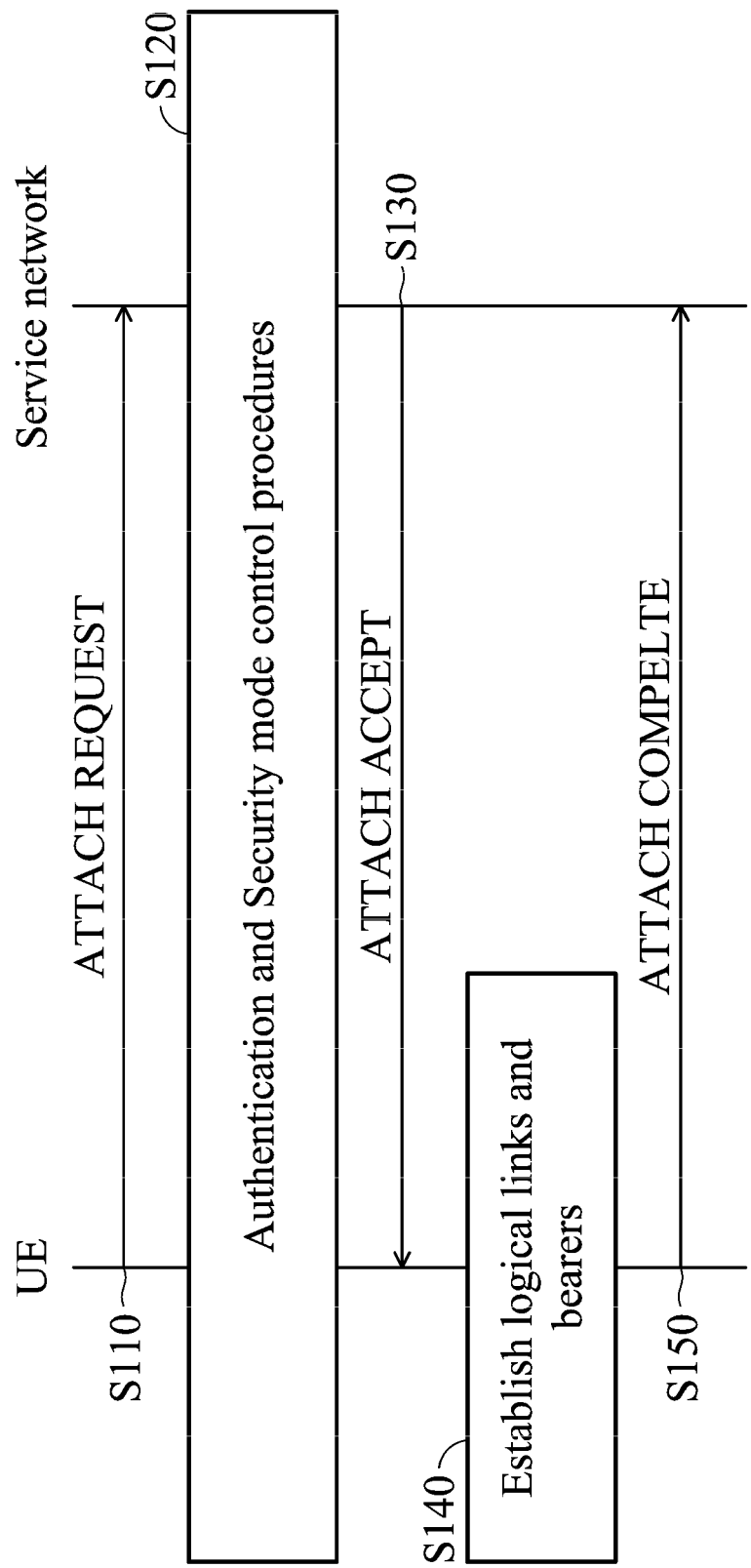
FIG. 1 is a message sequence chart illustrating an attachment procedure performed by a UE to a service network.
Figure 2:
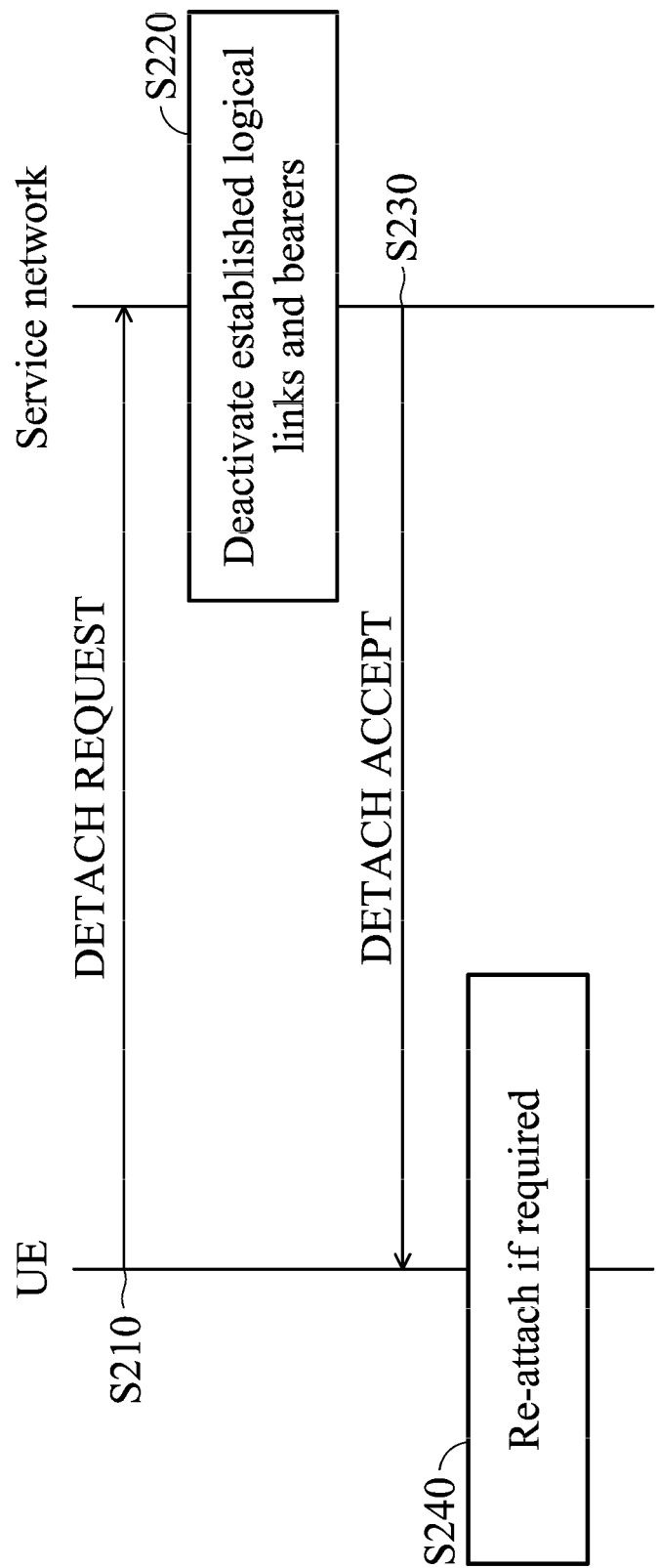
FIG. 2 is a message sequence chart illustrating a detachment procedure initiated by a UE.
Figure 3:
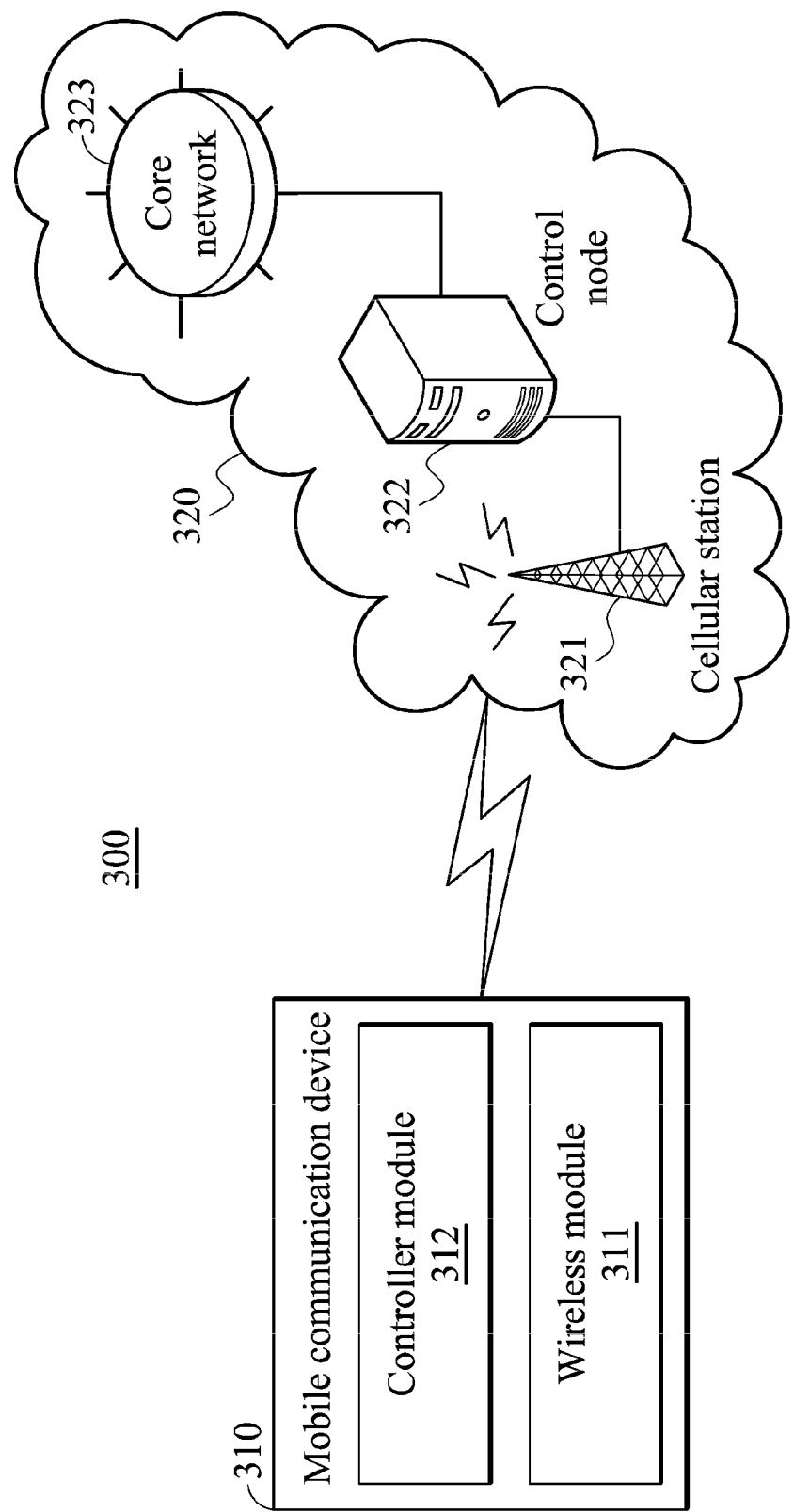
FIG. 3 is a block diagram illustrating a mobile communication environment according to an embodiment of the invention.

FIG. 3 is a block diagram illustrating a mobile communication environment according to an embodiment of the invention. In the mobile communications environment 300, the mobile communication device 310 is wirelessly connected to the service network 320 for obtaining mobile communication services. The service network 320 comprises a cellular station 321 and a control node 322, wherein the cellular station 321 is controlled by the control node 322 to performing the functionality of wireless transceiving for the service network 320. Particularly, the cellular station 321 may be a Home Node B (HNB) or Home enhanced Node B (HeNB) associated with a CSG to form a CSG cell for providing wireless access for member UEs of the CSG. The control node 322 is further connected to the core network 323 for interfacing with external networks, such as the Public Switched Telephone Network (PSTN), and interfacing with the Internet Protocol (IP) based Network, such as the Internet. The mobile communication device 310 comprises a wireless module 311 for performing the functionality of wireless transmissions and receptions to and from the cellular station 321. To further clarify, the wireless module 311 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 310 comprises a controller module 312 for controlling the operation of the wireless module 311 and other functional components, such as a display unit and/or keypad serving as an MMI (man-machine interface), a storage unit storing the program codes of applications or technologies, or others. In one embodiment, the service network 320 may be a WCDMA system and the mobile communication device 310 may be a UE in compliance with the 24.008 specification and other related specifications of the WCDMA technology, while in another embodiment, the service network 320 may be an LTE system and the mobile communication device 310 may be a UE in compliance with the TS 24.301 specification and other related specifications of the LTE technology. Alternatively, the mobile communication device 310 may be a UE in compliance with both of the specifications of the WCDMA and LTE technologies, and the invention is not limited thereto. Both the emergency services and non-emergency services may be bearer services or teleservices, and may be a circuited switched or packet switched types of services. In one example, the emergency service is a CS call and a teleservice. In another example, the emergency is an IMS call and a bearer service.

Figure 4:
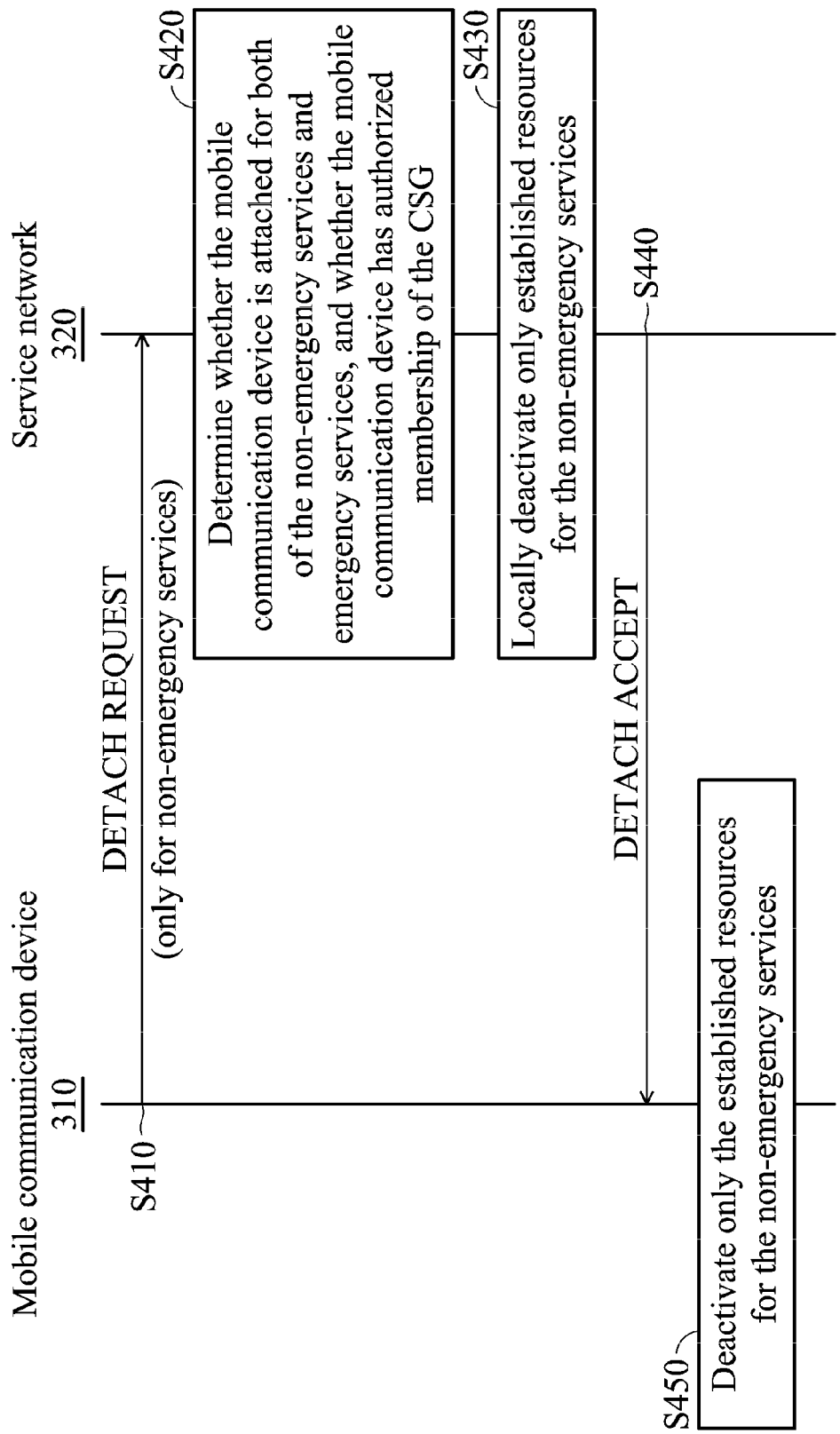
FIG. 4 is a message sequence chart illustrating a detachment procedure according to an embodiment of the invention.

To be more specific, the controller module 312 controls the wireless module 311 for performing a detachment procedure with the service network 320 via the cellular station 321. FIG. 4 is a message sequence chart illustrating a detachment procedure according to an embodiment of the invention. Initially, in this embodiment, the mobile communication device 310 is attached to the service network 320 via the cellular station 321 for both of the non-emergency services and the emergency services, and the cellular station 321 is associated with a CSG which only provides wireless access for members of the CSG. That is, when attaching to the service network 320, the mobile communication device 310 already has an authorized CSG membership with a valid period of time. To start the detachment procedure, the controller module 312 transmits a DETACH REQUEST message indicating detachment of only the non-emergency services to the cellular station 321 via the wireless module 311 (step S410). Specifically, the DETACH REQUEST message is transmitted. In one embodiment, the service network 320 may be a WCDMA system operating in the Network Mode of Operation 1 (NMO-1), and the DETACH REQUEST message may also comprise a detachment type indicator set to "IMSI detach" and not comprise a power off indication. In another embodiment, the service network 320 may be an LTE system, and the DETACH REQUEST message may also comprise a power-off bit and a detachment type indicator, wherein the power-off bit is set to "normal detach" and the detachment type indicator is set to "IMSI detach". When receiving the DETACH REQUEST message, the control node 322 determines whether the mobile communication device 310 is attached for both of the non-emergency services and emergency services, and whether the mobile communication device 310 has an authorized CSG membership (i.e., whether the previously authorized CSG membership is still valid) (step S420). If so, the control node 322 accepts the detachment request and locally deactivates only established resources for the non-emergency services (step S430), wherein the established resources may comprise Packet Data Protocol (PDP) context(s), Multimedia Broadcast/Multicast Services (MBMS) context(s), and logical link(s) for the non-emergency services. Next, the control node 322 transmits a DETACH ACCEPT message to the mobile communication device 310 (step S440). In response to the DETACH ACCEPT message, the controller module 312 deactivates only the established resources for the non-emergency services (step S450), and the detachment procedure ends. Thus, the emergency services may be continued.

Figure 5:
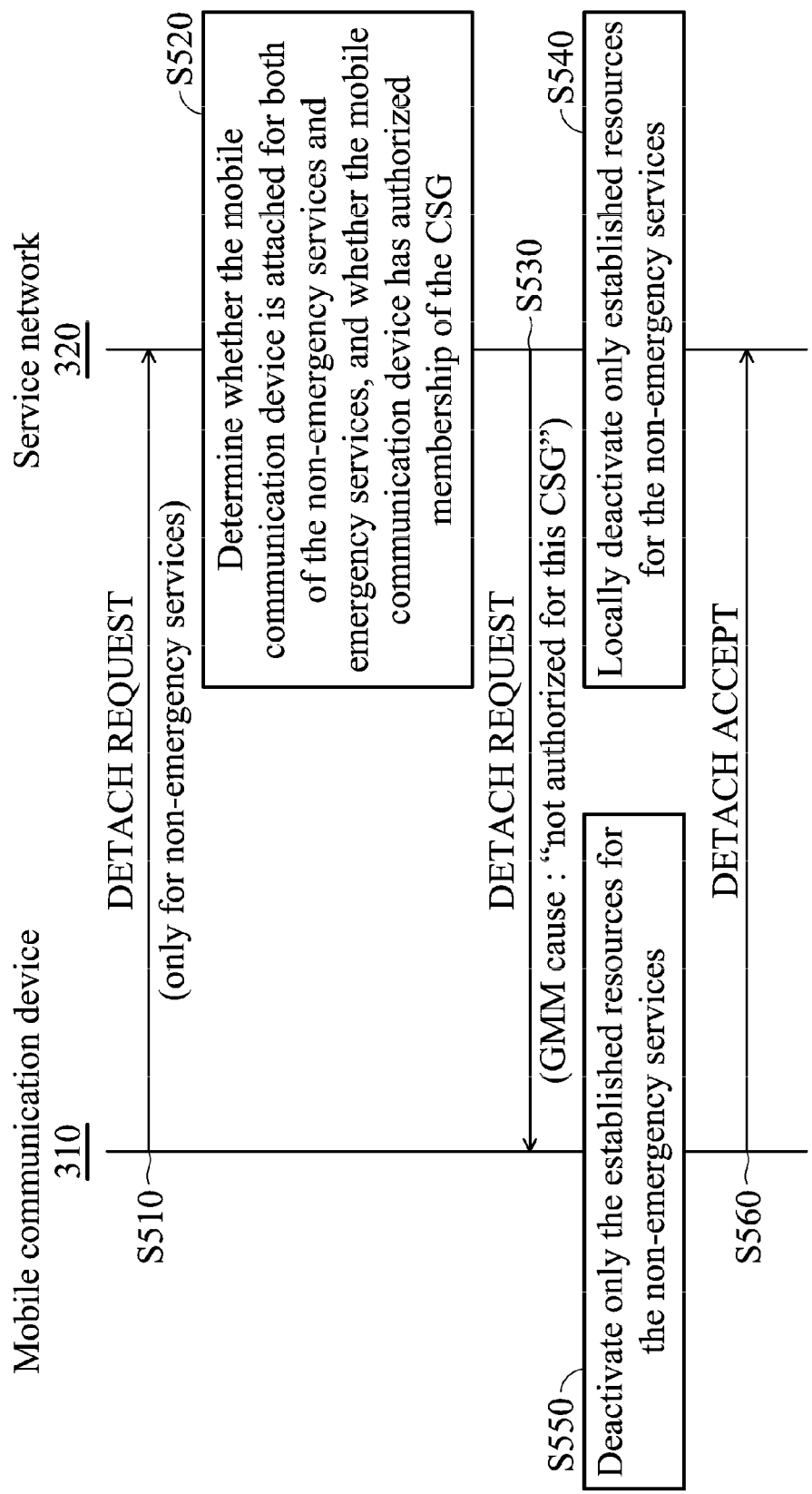
FIG. 5 is a message sequence chart illustrating a detachment procedure according to an embodiment of the invention.

FIG. 5 is a message sequence chart illustrating a detachment procedure according to an embodiment of the invention. Similar to FIG. 4, the mobile communication device 310 is attached to the service network 320 via the cellular station 321 for both of the non-emergency services and the emergency services, and the cellular station 321 is associated with a CSG which only provides wireless access for members of the CSG. That is, when attaching to the service network 320, the mobile communication device 310 already has an authorized CSG membership with a valid period of time. To start the detachment procedure, the controller module 312 transmits a DETACH REQUEST message indicating detachment of only the non-emergency services to the cellular station 321 via the wireless module 311 (step S510). Specifically, the DETACH REQUEST message is transmitted. In one embodiment, the service network 320 may be a WCDMA system operating in the NMO-1, and the DETACH REQUEST message may also comprise a detachment type indicator set to "IMSI detach" and not comprise a power off indication. In another embodiment, the service network 320 may be an LTE system, and the DETACH REQUEST message may also comprise a power-off bit and a detachment type indicator, wherein the power-off bit is set to "normal detach" and the detachment type indicator is set to "IMSI detach". When receiving the DETACH REQUEST message, the control node 322 determines whether the mobile communication device 310 is attached for both of the non-emergency services and emergency services, and whether the mobile communication device 310 has an authorized CSG membership (i.e., whether the previously authorized CSG membership is still valid) (step S520). If so, the control node 322 transmits another DETACH REQUEST message indicating unauthorized CSG membership to the mobile communication device 310 via the cellular station 321 (step S530). Specifically, the DETACH REQUEST message may comprise a GPRS Mobility Management (GMM) cause indicator set to "not authorized for this CSG". Next, the control node 322 only locally deactivates the established resources for the non-emergency services (step S540), wherein the established resources may comprise CS call, PDP context(s), MBMS context(s), and logical link(s) for the non-emergency services. In response to the DETACH REQUEST message from the service network 320, the controller module 312 deactivates only the established resources for the non-emergency services (step S550), and then transmits a DETACH ACCEPT message to the service network 320 via the wireless module 311 (step S560). The detachment procedure ends when the service network 320 successfully receives the DETACH ACCEPT message. Thus, the emergency services may be continued. Both the emergency services and non-emergency services may be bearer services or teleservices, and may be a circuited switched or packet switched types of services. In one example, the emergency service is a CS call and a teleservice. In another example, the emergency is an IMS call and a bearer service.

Figure 6:
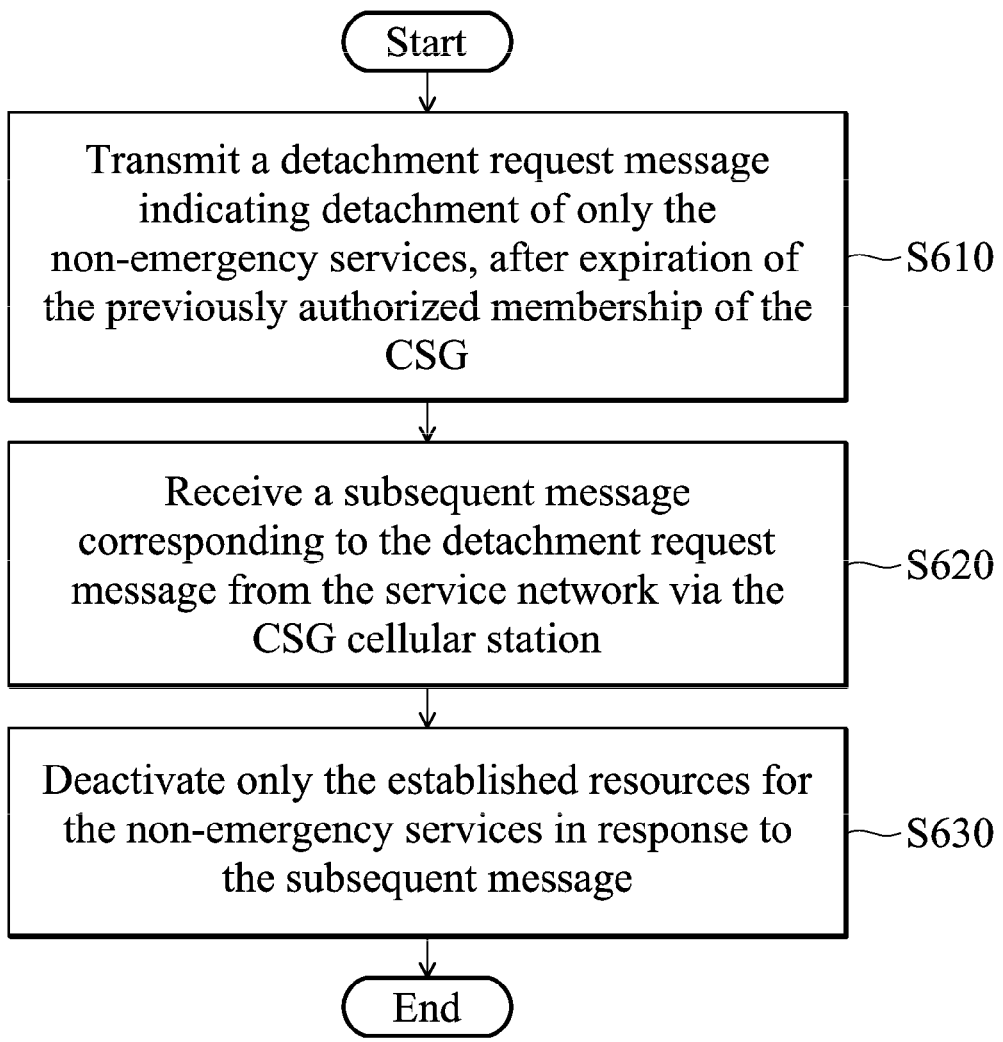
FIG. 6 is a flow chart illustrating a method for handling a detachment procedure upon expiration of a CSG subscription by a mobile communication device according to an embodiment of the invention.

FIG. 6 is a flow chart illustrating a method for handling a detachment procedure upon expiration of a CSG subscription by a mobile communication device according to an embodiment of the invention. In this embodiment, the mobile communication device is initially attached to a service network via the cellular station of the service network for both of the non-emergency services and the emergency services, wherein the cellular station is associated with a CSG which only provides wireless access for members of the CSG. That is, before/when attaching to the service network, the mobile communication device is authorized with a CSG membership and a valid period of time for the authorized membership. Later, a detachment procedure is initiated when the mobile communication device wishes to detach from only the non-emergency services and keep the emergency services. To begin, the mobile communication device transmits a detachment request message indicating detachment of only the non-emergency services, after expiration of the previously authorized CSG membership (step S610). Specifically, an authorized CSG membership may be considered as having expired if the valid period of time for the authorized membership has been reached. In one embodiment, the service network may be a WCDMA system and the mobile communication device may be a UE in compliance with the 24.008 specification and other related specifications of the WCDMA technology, and accordingly, the detachment request message may be a DETACH REQUEST message without a power off indication, which comprises a detachment type indicator set to "IMSI detach". In another embodiment, the service network may be an LTE system and the mobile communication device may be a UE in compliance with the TS 24.301 specification and other related specifications of the LIE technology, and accordingly, the detachment request message may be a DETACH REQUEST message comprising a power-off bit and a detachment type indicator, wherein the power-off bit is set to "normal detach" and the detachment type indicator is set to "IMSI detach". Alternatively, the mobile communication device may be a UE in compliance with both of the specifications of the WCDMA and LIE technologies, and the invention is not limited thereto. Next, the mobile communication device receives a subsequent message corresponding to the detachment request message from the service network via the cellular station (step S620). In one embodiment, the subsequent message may be a detachment acceptance message corresponding to the detachment request message transmitted in step S610. Specifically, if the service network is a WCDMA system or an LTE system, the detachment acceptance message may be a DETACH ACCEPT message. In another embodiment, the subsequent message may be a detachment request message other than to the detachment request message in step S610. Specifically, if the service network is a WCDMA system or an LIE system, the detachment request message may be a DETACH REQUEST message comprising a GMM cause indicator set to "not authorized for this CSG". In response to the subsequent message, the mobile communication device deactivates only the established resources for the non-emergency services in response to the subsequent message (step S630). For the service network, it also deactivates only the established resources for the non-emergency services in response to transmitting the subsequent message. Specifically, the established resources may comprise PDP context(s), CS call, MBMS context(s), and logical link(s) for the non-emergency services. Thus, only the non-emergency services are detached and the emergency services may continue to be offered. Both the emergency services and non-emergency services may be bearer services or teleservices, and may be a CS or PS types of services. In one example, the emergency service is a CS call and a teleservice. In another example, the emergency is an IMS call and a bearer service.

Figure 7:
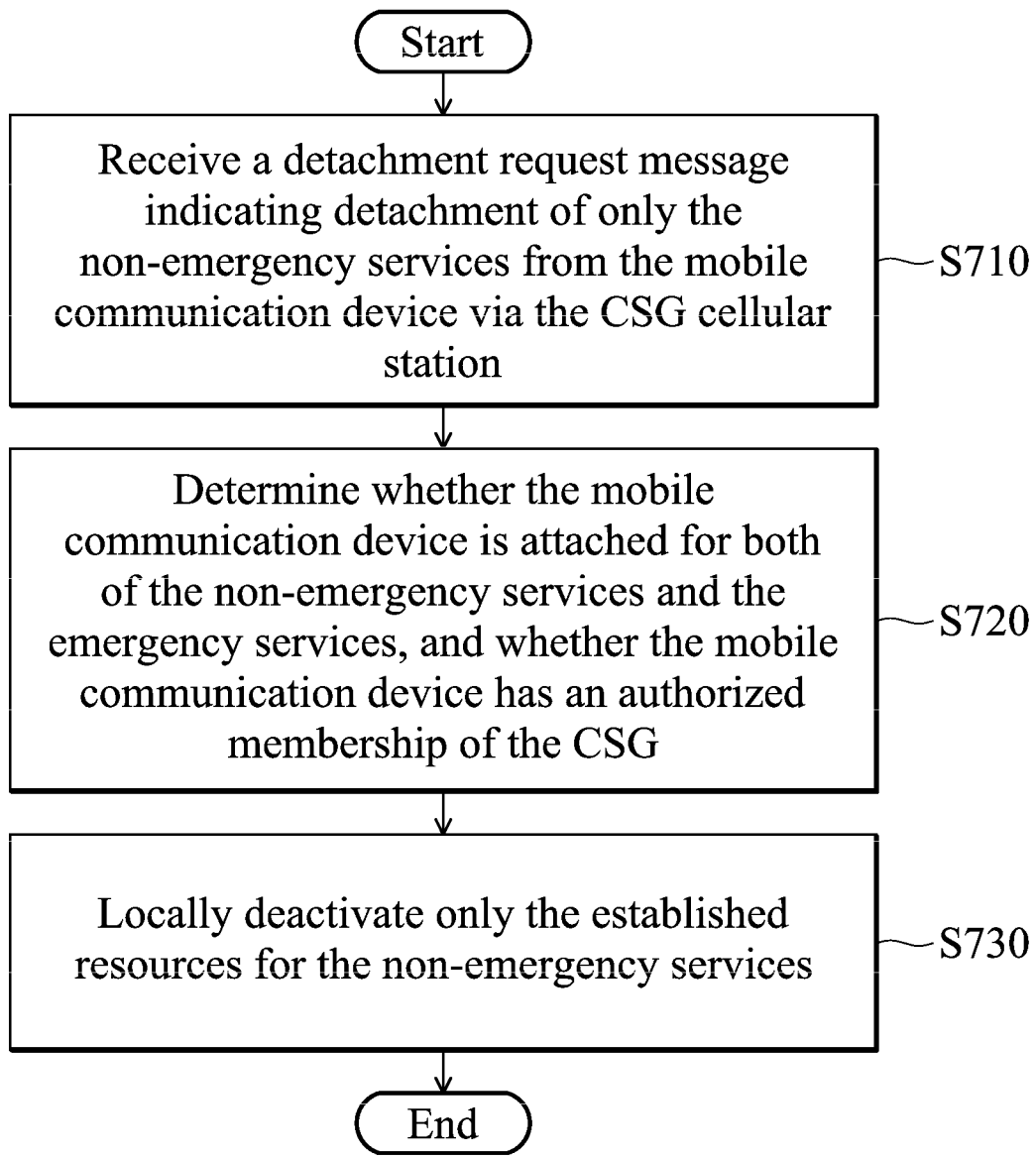
FIG. 7 is a flow chart illustrating a method for handling a detachment procedure upon expiration of a CSG subscription by a service network according to an embodiment of the invention.

FIG. 7 is a flow chart illustrating a method for handling a detachment procedure upon expiration of a CSG subscription by a service network according to an embodiment of the invention. In this embodiment, a mobile communication device is attached to the service network via a cellular station of the service network for both of the non-emergency services and the emergency services, wherein the cellular station is associated with a CSG which only provides wireless access for members of the CSG. That is, before/when attaching to the service network, the mobile communication device is authorized with a CSG membership and a valid period of time for the authorized membership. Later, a detachment procedure is initiated when the mobile communication device wishes to detach from only the non-emergency services and keeps the emergency services. To begin, the service network receives a detachment request message indicating detachment of only the non-emergency services from the mobile communication device via the CSG cellular station (step S710). In one embodiment, the service network may be a WCDMA system and the mobile communication device may be a UE in compliance with the 24.008 specification and other related specifications of the WCDMA technology, and accordingly, the detachment request message may be a DETACH REQUEST message without a power off indication, which comprises a detachment type indicator set to "IMSI detach". In another embodiment, the service network may be an LTE system and the mobile communication device may be a UE in compliance with the TS 24.301 specification and other related specifications of the LTE technology, and accordingly, the detachment request message may be a DETACH REQUEST message comprising a power-off bit and a detachment type indicator, wherein the power-off bit is set to "normal detach" and the detachment type indicator is set to "IMSI detach". Alternatively, the mobile communication device may be a UE in compliance with both of the specifications of the WCDMA and LTE technologies, and the invention is not limited thereto. Next, the service network determines whether the mobile communication device is attached for both of the non-emergency services and the emergency services, and whether the mobile communication device has an authorized CSG membership (step S720). In this embodiment, the CSG membership which was previously authorized to the mobile communication device, expires (i.e., the valid period of time for the authorized CSG membership has elapsed) before the service network receives the detachment request message. Since the mobile communication device is attached for both of the non-emergency services and the emergency services and does not have an authorized CSG membership, the service network locally deactivates only the established resources for the non-emergency services (step S730). Specifically, the established resources may comprise PDP context(s), CS call, MBMS context(s), and logical link(s) for the non-emergency services. Thus, only the non-emergency services are detached and the emergency services may continue to be offered. Both the emergency services and non-emergency services may be bearer services or teleservices, and may be a CS or PS types of services. In one example, the emergency service is a CS call and a teleservice. In another example, the emergency is an IMS call and a bearer service.

In one embodiment, the service network may subsequently transmit another detachment request message indicating unauthorized CSG membership to the mobile communication device via the CSG cellular station, so that the mobile communication device may deactivate only the established resources for the non-emergency services in response to receiving the detachment request. The mobile communication device may further transmit a detachment acceptance message corresponding to the service network via the CSG cellular station to end the detachment procedure. Specifically, if the service network is a WCDMA system or an LTE system, the detachment request message may be a DETACH REQUEST message comprising a GMM cause indicator set to "not authorized for this CSG", and the detachment acceptance message may be a DETACH ACCEPT message. In another embodiment, the service network may subsequently transmit a detachment acceptance message to the mobile communication device via the CSG cellular station, so that the mobile communication device may deactivate only the established resources for the non-emergency services in response to receiving the detachment request, and the detachment procedure ends.

Figure 8:
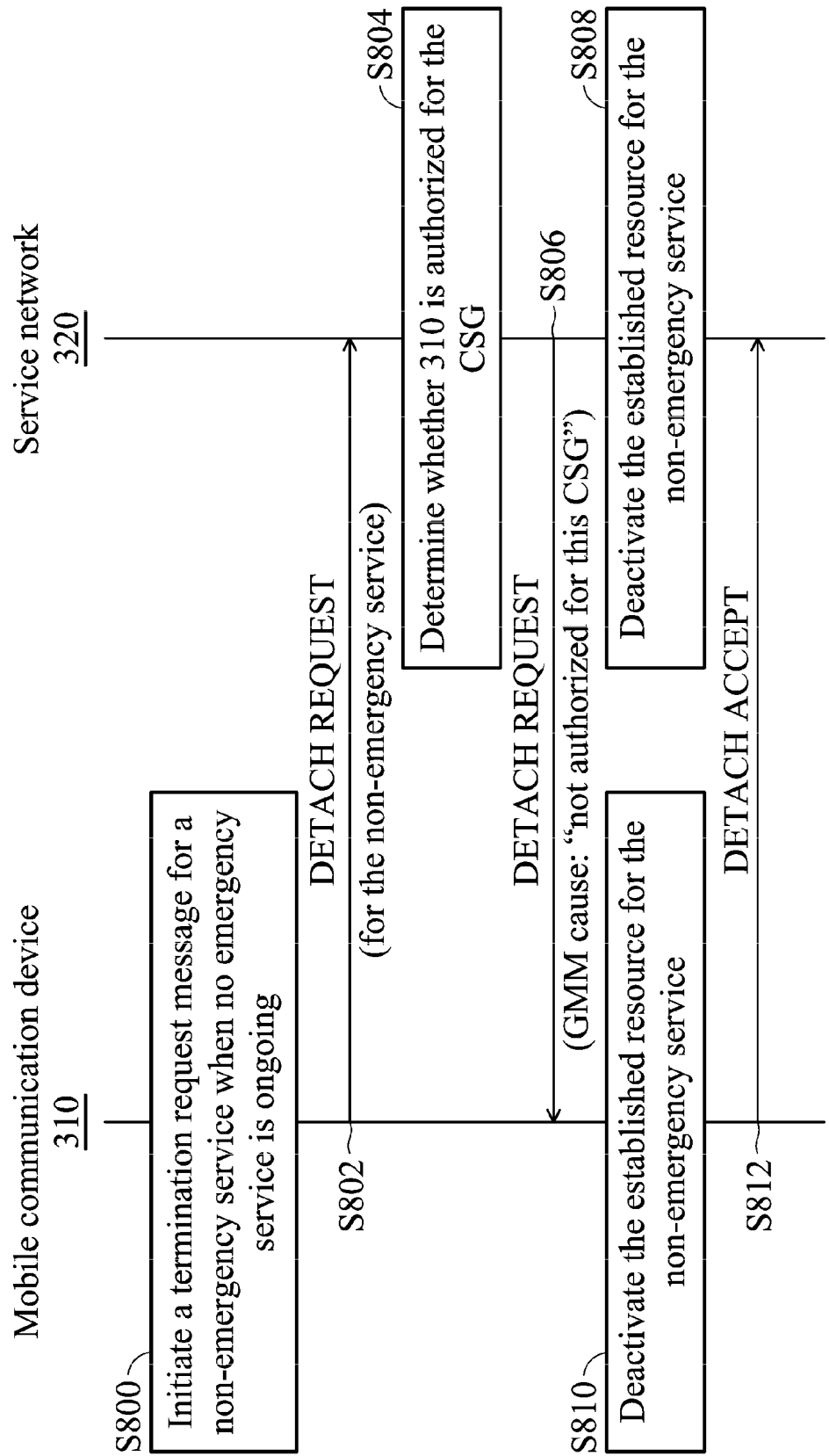
FIG. 8 is a message sequence chart depicting a detachment procedure according to an embodiment of the invention.

FIG. 8 is a message sequence chart depicting a detachment procedure according to an embodiment of the invention. Similar to FIG. 4, the mobile communication device 310 may be attached to the service network 320 via the cellular station 321 for both of the non-emergency services and the emergency services, and the cellular station 321 is associated with a CSG which only provides wireless access for members of the CSG. That is, when attaching to the service network 320, the mobile communication device 310 already has an authorized CSG membership with a valid period of time. Both the emergency services and non-emergency services may be bearer services or teleservices, and may be a CS or PS types of services. In one example, the emergency service is a CS call and a teleservice. In another example, the emergency is an IMS call and a bearer service. In one embodiment, the service network 320 comprises a WCDMA system operating in the NMO-1, i.e., the service network 320 sends the paging messages in the same logical channels for circuit switched (CS) and packet switched (PS) services. The emergency and non-emergency services may be circuit switched (CS) or packet switched (PS) based services. The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. In the NMO-1, the wireless communication device 310 performs a combined IMSI and GPRS attachment procedure by initiating an attach procedure for CS and PS services with the SGSN (not shown) in the core network 323. The core network 323 comprises a CS core network (not shown) such as GSM mobile network and a PS core network (not shown) such as a GPRS mobile network. As a Gs interface is present between an MSC/VLR (not shown) in the CS core network and the SGSN (not shown) in the PS core network, the latter is able to forward the IMSI attach request to the MSC/VLR thereby providing a combined attachment for the CS and PS services.

Upon expiration of the CSG membership the wireless mobile communication device 310 can no longer establish any new non-emergency service through the cellular station 321. The wireless communication device 310 attaching to a cell providing only limited services due to a change to a restricted Tracking Area or unauthorized CSG can initiate an Attach procedure, which indicates that the attachment is to receive emergency services. The service network 320 which supports emergency service for the wireless communication device 310 in limited service states provides emergency attachment services according to regulatory requirements. The wireless communication device 310 in limited service states may determine that the cell supports emergency services for IMS based emergency calls over UTRAN from a broadcast indicator in the access stratum layer. After expiration of the CSG subscription, the wireless communication device 310 attaching for both of the emergency and non-emergency services determines whether to only terminate the emergency service. Conventionally, the wireless communication device 310 issues a DETACH REQUEST message to the service network 320, and receives a DETACH REQUEST message in return due to the unauthorized CSG, resulting in termination of both the non-emergency and emergency services. As a consequence, the wireless communication device 310 has to initiate another emergency service, leading to unpleasant user experience and increased network complexity.

In the invention, prior to termination of the established non-emergency service, the control module 312 determines whether the emergency service is ongoing, and if so the control module 312 waits without initiating the detachment for the non-emergency service until the emergency service is completed (step S800). When there is no emergency service ongoing, or the emergency service is terminated, the control module 312 initiates a detachment request message for the non-emergency service by transmitting a DETACH REQUEST message indicating detachment of the non-emergency services to the cellular station 321 via the wireless module 311 (step S802). Specifically, the DETACH REQUEST message is transmitted. In one embodiment, the service network 320 may be a WCDMA system operating in the NMO-1, and the DETACH REQUEST message may also comprise a detachment type indicator set to "IMSI detach" and not comprise a power off indication. In another embodiment, the service network 320 may be an LIE system, and the DETACH REQUEST message may also comprise a power-off bit and a detachment type indicator, wherein the power-off bit is set to "normal detach" and the detachment type indicator is set to "IMSI detach". In still another embodiment, the non-emergency service is CS based, and the DETACH REQUEST message may be a disconnect request message requesting for disconnection of the non-emergency service from the CS core network. Upon receiving the DETACH REQUEST message, the control node 322 determines whether the mobile communication device 310 has an authorized CSG membership (i.e., whether the previously authorized CSG membership is still valid) (step S804). If the CSG subscription has expired, the control node 322 transmits another DETACH REQUEST message indicating unauthorized CSG membership to the mobile communication device 310 via the cellular station 321 (step S806). Specifically, the DETACH REQUEST message may comprise a GPRS Mobility Management (GMM) cause indicator set to "not authorized for this CSG". Next, since there is no emergency service ongoing between the wireless communication device 310 and the service network 320, the control node 322 only locally deactivates the established resources for the non-emergency services (step S808). The established resources may comprise CS call, PDP context(s), MBMS context(s), EPS bearer context(s) and logical link(s) for the non-emergency services. In response to the DETACH REQUEST message from the service network 320, the controller module 312 deactivates only the established resources for the non-emergency services (step S810), and then transmits a DETACH ACCEPT message to the service network 320 via the wireless module 311 (step S812). The detachment procedure ends when the service network 320 successfully receives the DETACH ACCEPT message. In the UMTS system, the service network 320 and the wireless communication device 310 deactivates the PDP contexts thereof for the non-emergency services in step S808 and S810 respectively. In the LIE system, the service network 320 and the wireless communication device 310 deactivates the EPS bearer contexts thereof for the non-emergency services in step S808 and S810 respectively.

The detachment procedure in FIG. 8 initiates detachment for the non-emergency service from the wireless communication device to the service network only when no emergency service is ongoing, thereby preventing unwanted emergency service termination and decreasing network signaling exchange complexity.

Figure 9:
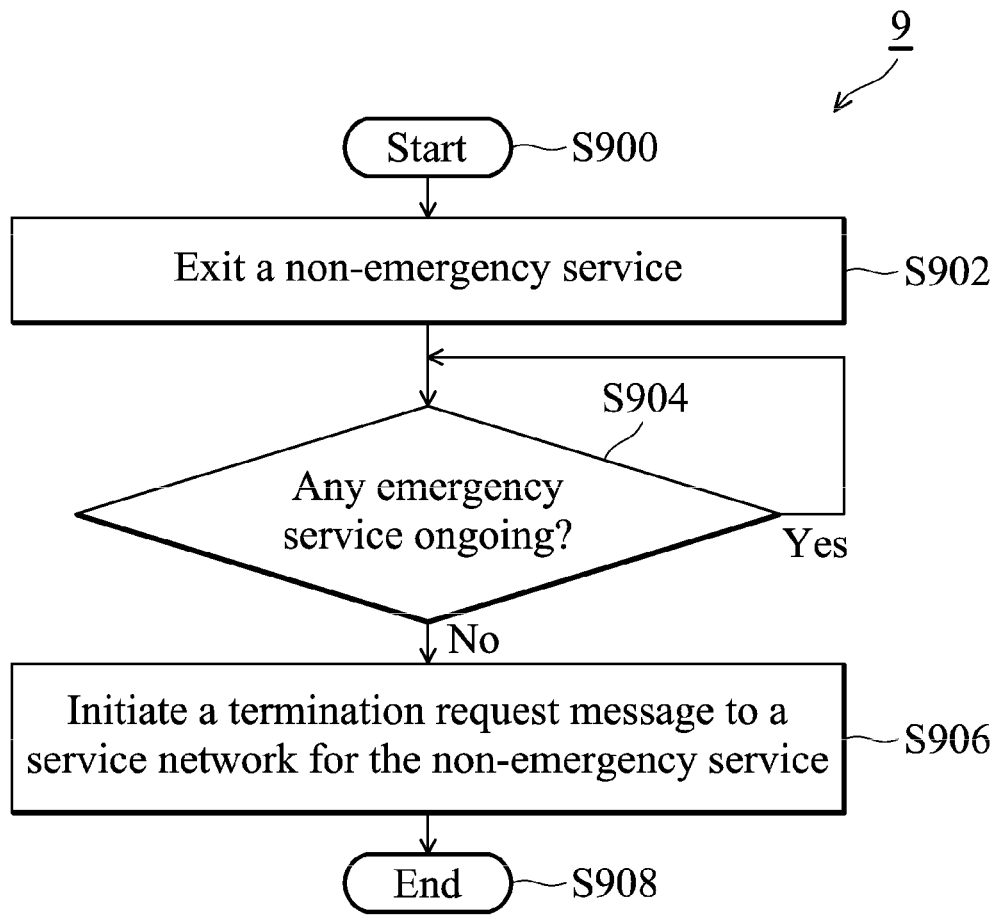
FIG. 9 is a flow chart illustrating a method 9 for handling a detachment procedure upon expiration of a CSG subscription by a service network according to an embodiment of the invention.

FIG. 9 is a flow chart illustrating a method 9 for handling a detachment procedure upon expiration of a CSG subscription by a service network according to an embodiment of the invention. In this embodiment, a mobile communication device is attached to the service network via a cellular station of the service network for the non-emergency services during initialization of the method 9 (S900), wherein the cellular station is associated with a CSG which only provides wireless access for members of the CSG. The mobile communication device may or may not further be attached to the service network via the cellular station for the emergency service. The emergency and non-emergency services may be circuit switched (CS) or packet switched (PS) based services. Both the emergency services and non-emergency services may be bearer services or teleservices. In one example, the emergency service is a CS call and a teleservice. In another example, the emergency is an IMS call and a bearer service. The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers.

Before/When attaching to the service network, the mobile communication device is authorized with a CSG membership for a valid period of time. Later, the mobile communication device determines to exit from the non-emergency service (S902), thus a detachment procedure is required to initiate detachment from only the non-emergency services. Prior to the detachment of the non-emergency services, the mobile communication device determines whether an emergency service is present (S904). If so, the detachment method 9 returns to Step S904 to check for the presence of the emergency service until no emergency service is ongoing. If no emergency service is present, the mobile communication device initiates a detachment request message indicating detachment of the non-emergency services to be delivered to the service network via the CSG cellular station (step S906). In one embodiment, the service network may be a WCDMA system and the mobile communication device may be a UE in compliance with the 24.008 specification and other related specifications of the WCDMA technology, and accordingly, the detachment request message may be a DETACH REQUEST message without a power off indication, which comprises a detachment type indicator set to "IMSI detach". In another embodiment, the service network may be an LTE system and the mobile communication device may be a UE in compliance with the TS 24.301 specification and other related specifications of the LTE technology, and accordingly, the detachment request message may be a DETACH REQUEST message comprising a power-off bit and a detachment type indicator, wherein the power-off bit is set to "normal detach" and the detachment type indicator is set to "IMSI detach". The mobile communication device may be a UE in compliance with the specifications of any CS and PS telecommunication technology, and the invention is not limited thereto. Lastly, the method 9 is completed and exited for the detachment procedure of the non-emergency service.

The service network may further determine whether the mobile communication device has an authorized CSG membership. Note that the CSG membership which was previously authorized to the mobile communication device, expires (i.e., the valid period of time for the authorized CSG membership has elapsed) before the service network receives the detachment request message. Since the mobile communication device is attached for only the non-emergency services and does not have an authorized CSG membership, the service network locally deactivates only the established resources for the non-emergency services. Specifically, the established resources may comprise PDP context(s), MBMS context(s), EPS bearer context(s) and logical link(s) for the non-emergency services. In one embodiment, the service network may subsequently transmit another detachment request message indicating unauthorized CSG membership to the mobile communication device via the CSG cellular station, so that the mobile communication device may deactivate the established resources for the non-emergency services in response to the detachment request originated by the mobile communication device. The mobile communication device may further transmit a detachment acceptance message corresponding to the service network via the CSG cellular station to end the detachment procedure. Specifically, if the service network is a WCDMA system or an LTE system, the detachment request message may be a DETACH REQUEST message comprising a GMM cause indicator set to "not authorized for this CSG", and the detachment acceptance message may be a DETACH ACCEPT message. In another embodiment, the service network may subsequently transmit a detachment acceptance message to the mobile communication device via the CSG cellular station, so that the mobile communication device may deactivate only the established resources for the non-emergency services in response to receiving the detachment request, which ends the detachment procedure 9.

Thus, the detachment method 9 initiates detachment for the non-emergency service from the wireless communication device to the service network only when no emergency service is ongoing, offering an approach to detach the non-emergency services from the service network without disrupting the emergency services.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling detachment procedures upon expiration of a CSG subscription may also be applied for mobile communication devices and service networks which are in compliance with the LTE-Advanced technology, or any evolutionary technology of the WCDMA/

LTE technology family. Therefore, the scope of the present invention shall be defined and protected by the following claims and their equivalents.

What is claimed is:

1. A mobile communication device, comprising:
a wireless module, performing wireless transceiving to and from a cellular station of a service network, wherein the cellular station is associated with a Closed Subscriber Group (CSG);
a controller module, configured with a membership of the CSG and attached to the service network, transmitting a detachment request message indicating detachment of only a Circuit Switch (CS) service to the cellular station via the wireless module, and deactivating only established resource for the CS service in response to receiving a detachment acceptance message corresponding to the detachment request message from the cellular station via the wireless module,
wherein the detachment acceptance message is in response to the mobile communication device having an ongoing emergency Packet Switch (PS) service and not having the authorized membership of the CSG.

2. The mobile communication device of claim 1, wherein the service network further deactivates only the established resource for a non-emergency PS service in response to the mobile communication device having the emergency PS service and not having authorized membership of the CSG.

3. The mobile communication device of claim 1 wherein the established resource comprises a PDP context, a CS call, a Multimedia Broadcast or Multicast Services (MBMS) contexts, or a logical link.

4. A control node in a service network, comprising:
a transceiver module, receiving a detachment request message from a mobile communication device via a cellular station, associated with a Closed Subscriber Group (CSG); and
a control module, determining whether the mobile communication device has an emergency Packet Switch (PS) service, and an authorized membership of the CSG, in response to the detachment request message, and deactivating only established resource for a Circuit Switch (CS) service in response to the mobile communication device having the emergency PS service and not having the authorized membership of the CSG,
wherein the transceiver module further transmits a detachment acceptance message corresponding to the detachment request message to the mobile communication device via the cellular station in response to the mobile communication device having the emergency PS service and not having the authorized membership of the CSG.

5. The control node of claim 4, wherein the established resource comprise a CS type, a PDP context, a Multimedia Broadcast or Multicast Services (MBMS) context, or a logical link.

* * * * *